United States Patent [19]
McIver

[11] Patent Number: 5,603,382
[45] Date of Patent: Feb. 18, 1997

[54] SHOVEL ATTACHMENT WITH EJECTOR BLADE FOR TRACTORS

[76] Inventor: Robert J. McIver, 2217 Buckhorn Rd., Sanford, N.C. 27330

[21] Appl. No.: 472,419

[22] Filed: Jun. 7, 1995

[51] Int. Cl.$^6$ .................................................. E02F 3/76
[52] U.S. Cl. ........................ 172/445.1; 37/901; 414/725
[58] Field of Search .......................... 37/405, 406, 407, 37/901; 172/444, 445, 445.1, 445.2, 445.3; 414/703, 725

[56] References Cited

U.S. PATENT DOCUMENTS

| | | | |
|---|---|---|---|
| 3,079,021 | 2/1963 | Kohorst et al. | 37/901 X |
| 3,426,928 | 2/1969 | Campbell | 414/725 X |
| 4,144,980 | 3/1979 | Meyer | 37/901 X |
| 4,524,532 | 6/1985 | Browning | 172/445.1 X |
| 4,915,575 | 4/1990 | Langenfeld et al. | 414/703 |
| 5,172,499 | 12/1992 | Griffin | 172/445.1 X |

Primary Examiner—Terry Lee Melius
Assistant Examiner—Robert Pezzuto
Attorney, Agent, or Firm—Mills & Associates

[57] ABSTRACT

This invention is an improved shovel attachment adapted for being mounted by the customary three-point hitch connection with a tractor enabling the shovel attachment to be carried on the tractor and raised or lowered by the preexisting hydraulic control mechanism of the tractor. The improved shovel attachment features a hydraulically actuated, ejector type blade that is forcibly transported across the floor of the carrying bowl of the shovel attachment for positive ejection of a load of earth fill materials from the same. The hydraulically actuated cylinder is pivotally connected with the rear surface of the ejector blade on one end and pivotally connected to an appropriate portion of the tractor at the other end thereof enabling the blade to be operated throughout the vertical limits of travel of the shovel attachment. The hydraulic cylinder is designed to be adapted to the preexisting hydraulic actuation mechanism associated with the tractor.

8 Claims, 2 Drawing Sheets

SHOVEL ATTACHMENT WITH EJECTOR BLADE FOR TRACTORS

FIELD OF INVENTION

This invention relates to ground working attachments for tractors and more particularly to shovel attachments for loading and unloading earth fill materials from the same.

BACKGROUND OF INVENTION

According to conventional practice, earth moving attachments for tractors typically include a shovel into which dirt and other earth fill materials are loaded. Upon movement of the tractor, the shovel is caused to cut into the materials to be loaded and directs the materials into the carrying bowl of the shovel as the tractor is moved backward. After the carrying bowl is filled, the shovel is raised to a carrying position and transported to the desired location by the tractor.

In the conventional practice the shovel is unloaded by tilting or pivoting the bowl to eject the earth fill materials. However, certain types of fill materials have a tendency to adhere to the walls and floor of the carrying bowl; and in cold weather, wet materials have a tendency to freeze in the bowl. In either of such circumstances the carrying bowl must be raised to a relatively high angle in order to develop sufficient sheer to dump fill materials. The reliance on gravity to unload the bowl and the resultant need for lifting of the same to a relatively sharp angle produces frequent difficulties in unloading the shovel attachment and requires an arrangement of the tractor which tends to be unstable and subject to tilting in slippery soils or rough terrain.

CONCISE EXPLANATION OF PRIOR ART

U.S. Pat. No. 2,718,718 to Armor Bartlett discloses an adjustable scoop assembly adapted for being mounted on a tractor by means of the customary three-point connection with the tractor, thus enabling the scoop assembly to be raised or lowered from the tractor.

U.S. Pat. No. 3,152,410 to James T. Monk discloses an earth scraper machine which incorporates a power actuated pusher blade for ejecting earth fill materials from the carrying bowl.

U.S. Pat. No. 2,548,461 to Bruno F. Arps discloses a reverse scoop attachment for tractors which is designed to be loaded from the front and dumped from the rear.

U.S. Pat. No. 2,518,105 to Frank F. Werth discloses a power shovel and fork attachment for tractors including means for pivotally lifting and lowering a tractor scoop.

U.S. Pat. No. 2,254,292 to Martin E. Jones discloses a scoop attachment for tractors which is manipulated by a tractor operated lifting and lowering mechanism, in combination with a lever arrangement which automatically positions the scoop in an angular position relative to the surface of the ground.

U.S. Pat. No. 2,306,474 to Henry A. Tieslau discloses a vehicular shovel which may be readily attached in front of the tractor for its loading with material at or adjacent ground level by driving the tractor forwardly.

U.S. Pat. No. 3,465,458 to Robert G. Wagner discloses an ejector assembly for earth moving scrapers having an ejector plate pivotally connected at its base to an ejector carriage.

U.S. Pat. No. 3,260,386 to William J. Engstrom discloses a scoop pivotally mounted upon the rear end of a tractor which may be adapted for various purposes.

Finally, U.S. Pat. No. 1,200,196 to August Huberty is considered of general interest in that it discloses a snow shovel having a manually operated blade for unloading a shovel full of snow.

BRIEF DESCRIPTION OF INVENTION

After much research and study into the above mentioned problems, the present invention has been developed to provide an improved shovel attachment adapted for being mounted by means of the customary three-point hitch connection with a tractor.

In particular the shovel attachment of the present invention is fabricated on a supporting frame that is so arranged and constructed as to be attached to the tractor by the usual three-point hitch connection, thus enabling the support frame to be carried on the tractor and raised or lowered by the hydraulic control mechanism of the tractor.

In addition, the improved shovel attachment features a hydraulically actuated, ejector type blade for pushing a load of earth fill materials from the carrying bowl eliminating the problems caused by adhesion and freezing of materials in the carrying bowl.

In view of the above, it is an object of the present invention to provide an improved shovel attachment for being mounted on a tractor by means of the conventional three-point connection with the tractor, thus enabling the shovel attachment to be raised or lowered by the usual control mechanism of the tractor.

Another object of the present invention is to provide a hydraulically actuated, ejector blade for ejecting earth fill materials from the carrying bowl of the shovel attachment.

Another object of the present invention is to provide a shovel attachment for a tractor that can be readily installed when needed and readily removed when no longer required.

Another object of the present invention is to provide a simple but functional shovel attachment with an ejector blade that is relatively inexpensive in comparison to similar devices presently available on heavy earth working machines.

Other objects and advantages of the present invention will become apparent and obvious from a study of the following description and the accompanying drawings which are merely illustrative of such invention.

DETAILED DESCRIPTION OF INVENTION

Figure 1:
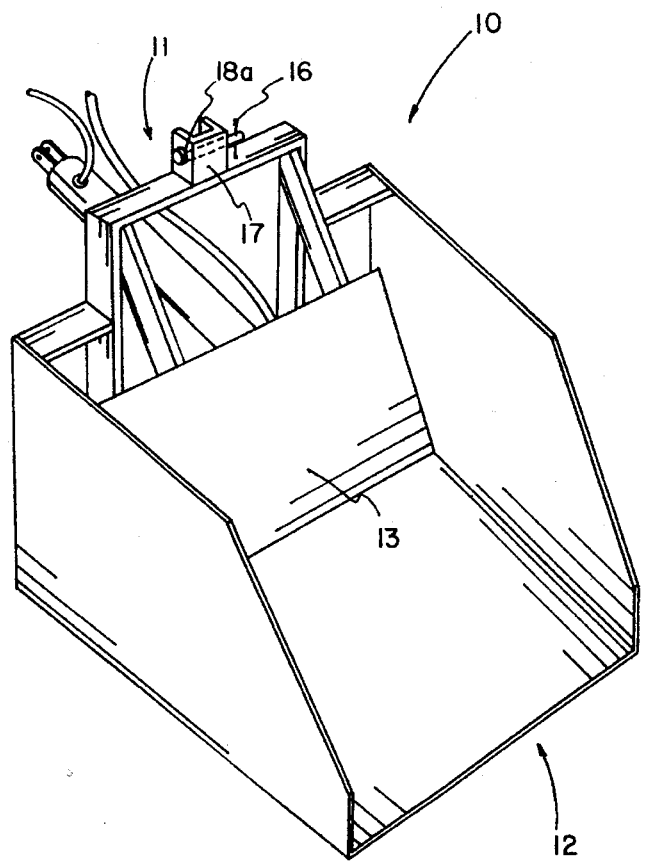
FIG. 1 is a perspective view of the shovel attachment of the present invention.

With further reference to the drawings the shovel attachment for a tractor in accordance with the present invention, indicated generally at 10, is illustrated in FIG. 1.

As previously noted a support frame structure indicated generally at 11 including a bowl assembly, indicated generally at 12, fixedly mounted thereto is so constructed as to be adapted for mounting on a tractor by means of the customary three-point hitch of the tractor as hereinafter described. Thus, support frame structure 11 together with bowl assembly 12 may be carried on the tractor and raised or lowered by the hydraulic control mechanism of the tractor.

Before describing the shovel attachment of the present invention in detail, it may be beneficial to basically review the structure of a tractor whereon it is to be mounted.

Figure 2:
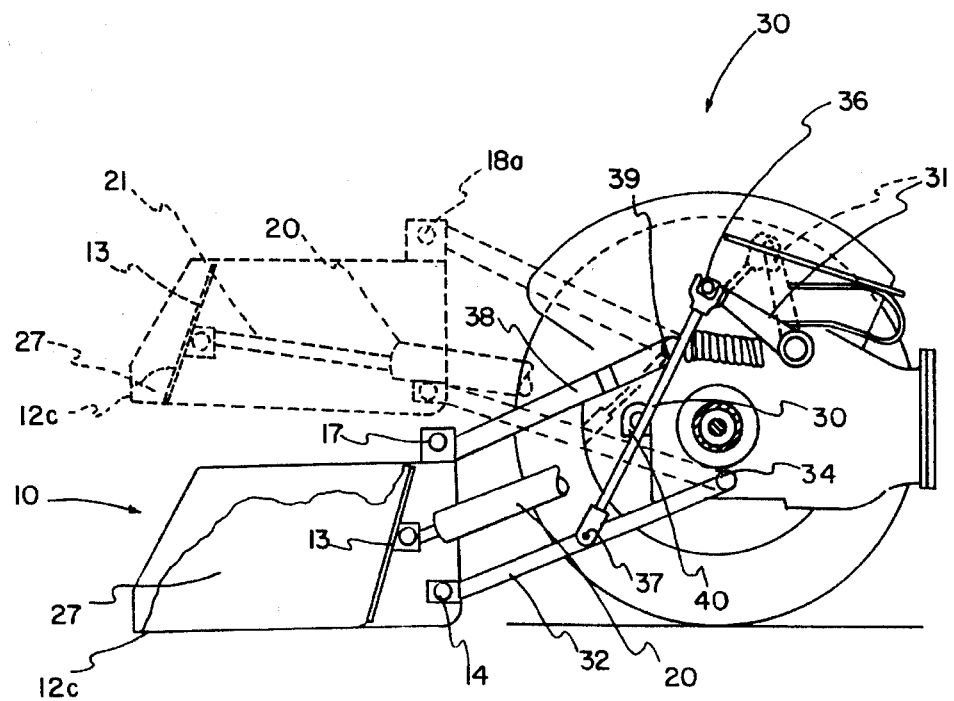
FIG. 2 is a side elevational view of the portion of the rear axle of a conventional tractor showing the invention connected thereto.

Turning now to FIG. 2, there is shown a portion of the rear axle of a tractor, indicated generally at 30, whereon shovel attachment 10 is mounted. Tractor 30 is shown with the conventional hydraulic actuating mechanism links 31 attached thereto. A pair of connecting arms 32 are pivotally mounted on an appropriate portion of the tractor structure as at 34.

Figure 3:
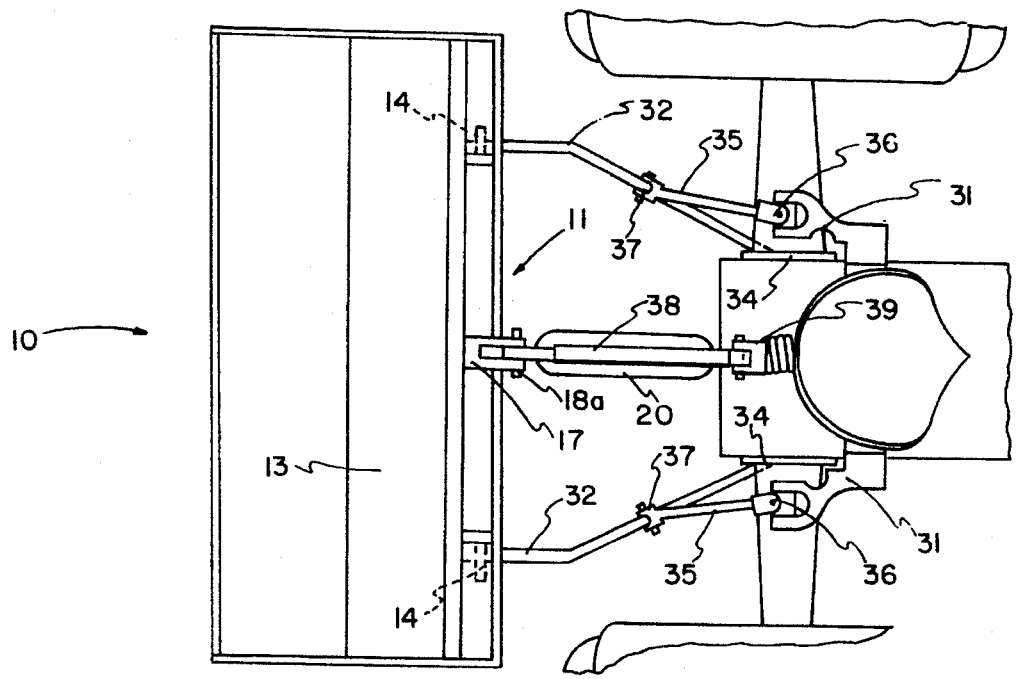
FIG. 3 is a top plan view of the invention mounted on the rear of the tractor as shown in FIG. 2.

As more clearly shown in FIG. 3, shovel attachment 10 is received at the terminal portions of arms 32, and at a terminal end of an upper support bar 38, completing the conventional three-point hitch previously mentioned herein and is secured thereto by suitable attachment means. In the preferred embodiment the attachment means comprises a pair of lug pins 14 fixedly attached to support frame structure 11. Lug pins 14 loosely penetrate mounting apertures 15 at the terminal ends of arms 32.

Figure 4:
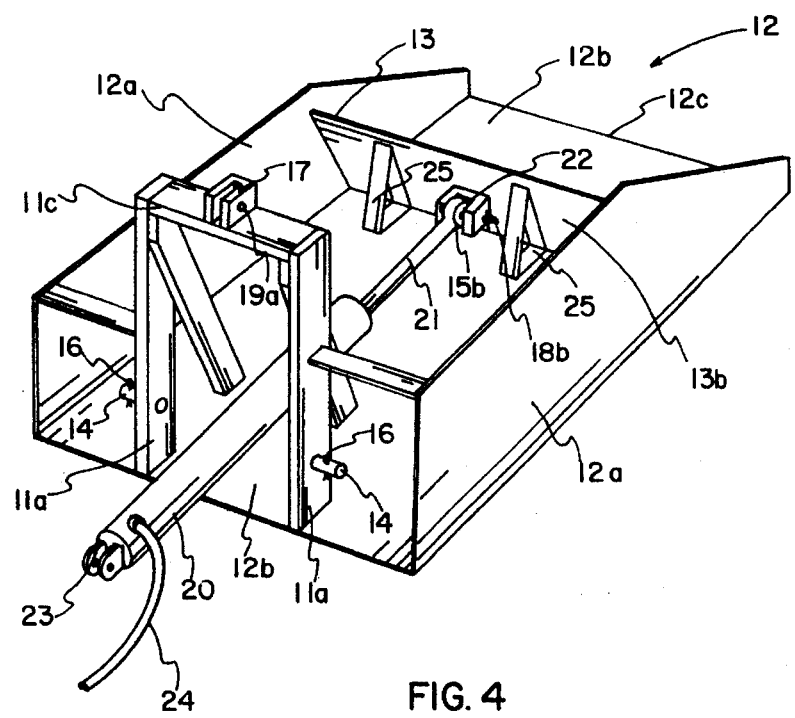
FIG. 4 is a perspective view of the shovel attachment of the present invention with the ejector blade in an extended position as shown from the rear.

Lug pins 14 may be retained in functional position with arms 32 by means of a clevis pin 16 or other suitable retaining device as is more clearly shown in FIG. 4.

Still referring to FIG. 3, a pair of tie rods 35 each having a universal joint connection 36 at one end thereof and each having a pivoted connection 37 at the other end thereof are operatively connected to hydraulic actuating links 31 and their respective connecting arms 32.

Attached to support frame structure 11 is a lug bracket 17 adapted to receive the terminal end of upper support bar 38. Lug bracket 17 is fixedly attached at the center line of support frame structure 11 at the top edge thereof. Upper support bar 38 is pivotally connected at a terminal end thereof to lug bracket 17 by a pivot pin 18a which is inserted through a pair of pivot holes 19a in lug bracket 17, as is more clearly shown in FIG. 4.

Upper support bar 38 includes a mounting aperture (not shown) at its terminal end which may be positioned in substantial alignment with pivot holes 19a of lug bracket 17 to permit pivot pin 18a to be inserted therethrough retaining upper support bar 38 in pivoting relation thereto. Upper support bar 38 is pivotally connected at the other end thereof to an appropriate portion of the tractor structure as at 39. Upon actuation of the conventional hydraulic system within the tractor, actuating links 31 are moved arcuately thereby lifting or depressing tie rods 35. As tie rods 35 are moved, connecting arms 32 are selectively lifted or depressed thereby imparting a generally vertical travel to shovel attachment 10 as illustrated in broken outline in FIG. 2.

Now, turning to FIG. 4, there is shown therein a rear view of shovel attachment 10 including ejector blade 13 and the hydraulic cylinder 20 by which it is operated. Hydraulic cylinder 20 is positioned on a center line of bowl assembly 12 such that a terminal end of actuating rod 21 is disposed adjacent a back surface 13b of ejector blade 13. Secured or integrally formed with back surface 13b is a blade lug bracket 22 similar to the herein above described lug bracket 17.

Lug bracket 22 includes a pair of pivot holes 19b (not shown) having a common axis of symmetry wherein pivot pin 18b may be installed. Actuating rod 21 is provided with a mounting aperture 15b which may be disposed between pivot holes 19b in substantial alignment therewith such that pivot pin 18b may be installed therethrough retaining actuating rod 21 in an operative relationship with blade 13.

A cylinder lug bracket 23 is secured or integrally formed with an opposite end of cylinder 20 and is designed to be pivotally received on an appropriate portion of the tractor structure as at 40.

Cylinder 20 is provided with at least two hydraulic fluid lines 24 for connection of cylinder 20 to the hydraulic system within the tractor.

Still referring to FIG. 4, for a more detailed description of the structure of shovel attachment 10, bowl assembly 12 will be seen to include a pair of lateral side walls 12a disposed in parallel spaced apart relation. To side walls 12a, a floor 12b is fixed so that bowl assembly 12 can receive and contain earth fill materials.

The terminal ends of lateral side walls 12a may be clipped and tapered toward discharge edge 12c to provide a characteristic shovel appearance as clearly shown in FIG. 4.

Lateral side walls 12a are connected to support frame structure 11, specifically to opposed vertical frame elements 11a and to horizontal frame elements 11b extending outwardly and in perpendicular relation thereto. Horizontal frame elements 11b are positioned at a predetermined vertical height from floor 12b substantially coincident with a top edge of lateral side walls 12a as shown in FIG. 4. A transverse frame element 11c is connected to the vertical element frame elements 11a at their upper junctures.

In the preferred embodiment, vertical frame elements 11a, horizontal frame elements 11b and 11c are attached at their junctures and to lateral side walls 12a and floor 12b by weldment.

Still referring to FIG. 4, it will be appreciated that ejector blade 13 is fabricated to a length that is slightly smaller than the interior dimension measured between lateral side walls 12a. Blade 13 is designed to upstand from floor 12b and is spaced closely thereto such that blade 13 may be transported over floor 12b for pushing a charge of earth fill material over discharge edge 12c and out of bowl assembly 12.

In the embodiment shown, anti-friction skids 25 are provided to act between blade 13 and floor 12b in order to facilitate the movements of blade 13 back and forth across floor 12b. It will be appreciated that skids 25 locate the lower edge of blade 13 closely to but spaced apart from an upper surface of floor 12b.

In order to transport blade 13 reciprocally over the floor 12b, hydraulic cylinder 20 provides the means to forcibly extend and retract actuating rod 21 which is pivotably coupled to blade lug bracket 22 by means of a pivot pin 18b or other suitable retaining means.

Hydraulic cylinder 20 may be operated by a hydraulic control valve (not shown) adapted to be mounted on tractor 30 for the convenience of the operator. The hydraulic control valve is tied into the conventional hydraulic mechanism of tractor 30 and is provided with fittings to receive hydraulic lines 21 from hydraulic cylinder 20. Such hydraulic control valves are well known in the prior art and further detailed discussion of the same is deemed unnecessary.

In the normal operation of the present invention, shovel attachment 10 is attached to the tractor by the usual three-point hitch connection previously described. Shovel attachment 10 is lowered to a ground level position utilizing the conventional hydraulic system within tractor 30 as illustrated in FIG. 2.

In accordance with the present invention, tractor 30 is operated in a reverse direction to load a quantity of earth fill material 27 into bowl assembly 12. It will be appreciated that in this loaded condition, blade 13 is fully retracted by operation of hydraulic cylinder 20 (shown in cutaway view for clarity) as illustrated in FIG. 2.

Assuming that a quantity of earth fill material 27 has been loaded into bowl assembly 12 and further assuming that shovel attachment 10 has been transported by tractor 30 to a location where it is desired to dump the earth fill material 27, shovel attachment 10 and ejector blade 13 will have been positioned as illustrated in solid outline in FIG. 2.

To initiate the unloading of carrying bowl 12 shovel attachment 10 is typically raised and hydraulic cylinder 20 is operated extending actuating rod 21 in a generally forward direction thereby advancing ejector blade 13 and pushing earth fill materials 27 over the discharge edge 12c and out of carrying bowl 12.

It will be understood that due to the pivoted mounting arrangement of cylinder 20 by actuating rod 21 on bracket 22 at one end and by bracket 23 at the other end thereof at 40, blade 13 may be operated throughout the vertical limits of travel of shovel attachment 10.

Comparing the two positions of shovel attachment 10 which are illustrated in FIG. 2, it will be noted that in the ground level position as illustrated in solid outline in FIG. 2, discharge edge 12c at a front end of shovel attachment 10 is slightly lower in relation to a back end thereof which facilitates loading by directing the materials into the carrying bowl 12 as tractor 30 is advanced.

By way of contrast, it will be appreciated that in the raised position as in broken outline in FIG. 2, discharge edge 12c is slightly higher in relation to a back end of bowl assembly 12 in order to prevent spillage of the materials during transport to the location where they are to be dumped.

This tilting movement of floor 12b in relation to the horizontal is due to the generally arcuate movement of hydraulic actuating links 31 by actuation of the hydraulic system within tractor 30 imparting an arcuate travel to shovel attachment 10.

The relative angle of floor 12b to horizontal is made adjustable by providing upper support bar 38 with length adjustment means.

From the above it can be seen that the present invention provides a relatively simple but functional shovel attachment including an ejector blade that is so arranged and constructed as to be easily attached to the tractor by the usual three-point hitch connection enabling the present invention to be carried on the tractor and raised or lowered by the usual control mechanism of the tractor.

Further, the present invention provides a simple yet functional hydraulically actuated ejector blade that is arranged for positive ejection of a load of earth fill materials from the shovel attachment.

The terms "upper", "lower", "side", "front", "back" and so forth have been used herein merely for convenience to describe the present invention and its parts as oriented in the drawings. It is to be understood, however, that these terms are in no way limiting to the invention since such invention may obviously be disposed in different orientations when in use.

The present invention may, of course, be carried out in other specific ways than those herein set forth without departing from the spirit and essential characteristics of such invention. The present embodiments are, therefore, to be considered in all respects as illustrative and not restrictive, and all changes coming within the meaning and equivalency range of the appended claims are intended to be embraced therein.

What is claimed is:

1. A shovel attachment adapted for use with a tractor having a conventional three-point hitch, said shovel attachment comprising:

a carrying bowl means defined by a pair of generally parallel side walls and a floor affixed relative to said side walls and extending therebetween to receive and contain earth fill materials therein;

means for releasably attaching said bowl means to said three-point hitch of said tractor enabling said shovel attachment to be raised and lowered by said three-point hitch;

an ejectment means positioned in an operative relationship with said carrying bowl means permitting a load of earth fill materials contained within said bowl means to be positively ejected; and means for reciprocally transporting said ejectment means over said floor enabling said carrying bowl means to be alternately loaded and unloaded at any position within limits of travel of said shovel attachment.

2. The shovel attachment of claim 1 wherein said ejectment means comprises a generally vertically disposed, transverse ejector blade conforming closely to an interior contour of said carrying bowl means, said blade being transportable over said floor of said carrying bowl means for ejecting a load of earth fill material from said bowl means.

3. The shovel attachment of claim 2 wherein said ejector blade is provided with a plurality of anti-friction skids being disposed in functional relation to a lower peripheral edge of said blade permitting said blade to be positioned in closely spaced apart relation to the interior surfaces of said carrying bowl means thereby reducing frictional contact between said blade and said bowl means.

4. The shovel attachment of claim 3 wherein said ejector blade is pivotally coupled to said transporting means enabling said transporting means to be pivoted in a vertical plane at varying angles permitting said blade to be forcibly extended and retracted at any point within the vertical limits of travel of said shovel attachment.

5. The shovel attachment of claim 4 wherein said ejector blade is fabricated from steel plate.

6. The shovel attachment of claim 1 wherein said transporting means comprises a hydraulic cylinder having an actuating rod extending therefrom in an axial direction, said actuating rod being pivotally connected to said ejectment means permitting said ejectment means to be forcibly extended and retracted in relation to said cylinder.

7. The shovel attachment of claim 6 wherein said hydraulic cylinder is pivotally attached at a predetermined location on said tractor to allow said cylinder to be pivoted in a vertical plane at varying angles permitting said ejectment means to be forcibly extended and retracted at any point within the vertical limits of travel of said shovel attachment.

8. The shovel attachment of claim 7 wherein said hydraulic cylinder may be adapted to a preexisting hydraulic actuating mechanism associated with said tractor to function in cooperation therewith.

* * * * *